(12) United States Patent
Ducheneaux et al.

(10) Patent No.: US 9,840,283 B2
(45) Date of Patent: Dec. 12, 2017

(54) MACHINE FRAME

(71) Applicant: Caterpillar Inc., Peoria, IL (US)

(72) Inventors: Travis Ducheneaux, Dunlap, IL (US);
Kevin Miller, Morton, IL (US); Rohit Gujarathi, Naperville, IL (US); Kenton Wyckoff, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 15/050,542

(22) Filed: Feb. 23, 2016

(65) Prior Publication Data

US 2017/0240209 A1     Aug. 24, 2017

(51) Int. Cl.
*B62D 21/18*     (2006.01)
*B62D 55/10*     (2006.01)

(52) U.S. Cl.
CPC .......... *B62D 21/186* (2013.01); *B62D 55/10* (2013.01)

(58) Field of Classification Search
CPC ....... B62D 21/186; B62D 21/12; B62D 55/10
See application file for complete search history.

(56) References Cited

U.S. PATENT DOCUMENTS

| | | | |
|---|---|---|---|
| 3,767,254 A | 10/1973 | Skanes et al. | |
| 4,078,616 A | 3/1978 | Hisamatsu et al. | |
| 4,151,920 A | 5/1979 | Shoup | |
| 4,186,812 A * | 2/1980 | Sutton ............... | B62D 55/0842 180/9.5 |
| 4,221,267 A | 9/1980 | Asal et al. | |
| 4,391,341 A * | 7/1983 | Taghon .................. | B62D 55/10 180/6.7 |
| 6,293,364 B1 * | 9/2001 | Anderson ............ | B60K 15/063 180/312 |
| 7,182,369 B2 * | 2/2007 | Baumann ............... | B62D 21/04 280/781 |
| 7,866,700 B2 | 1/2011 | Weibling et al. | |
| 7,997,619 B2 * | 8/2011 | Sugimoto ............ | B62D 21/186 280/124.109 |
| 8,548,691 B2 | 10/2013 | Hayashi et al. | |
| 8,700,271 B2 | 4/2014 | Evenson et al. | |
| 8,919,455 B2 | 12/2014 | Hendron et al. | |
| 9,026,319 B2 | 5/2015 | Hayashi et al. | |
| 2003/0178834 A1 * | 9/2003 | Grimm .................. | B62D 21/12 280/781 |
| 2005/0001078 A1 * | 1/2005 | Engelbrecht ........ | A01M 7/0082 239/743 |
| 2005/0167969 A1 * | 8/2005 | Fukazawa .............. | B62D 55/06 280/785 |

(Continued)

FOREIGN PATENT DOCUMENTS

EP     0849406     6/2002

*Primary Examiner* — Drew J Brown

(57) ABSTRACT

A frame assembly for a machine is disclosed. The frame assembly includes a main frame including a pair of spaced apart members extending longitudinally between the front and back of the machine and a front frame. The front frame includes a top plate having a first portion extending between the spaced apart members and a bottom plate coupled to the top plate. The bottom plate has a second portion extending between the spaced apart members. The front frame is connected to the main frame by attaching at least a portion of the first portion and at least a portion of the second portion to the spaced apart members.

8 Claims, 4 Drawing Sheets

(56) References Cited

U.S. PATENT DOCUMENTS

| 2007/0290526 A1* | 12/2007 | Takeuchi | B62D 55/10 |
| | | | 296/204 |
| 2014/0239670 A1* | 8/2014 | Tochigi | B62D 21/186 |
| | | | 296/187.08 |

* cited by examiner

MACHINE FRAME

TECHNICAL FIELD

The present disclosure relates generally to machines. In particular, the present disclosure relates to a frame of a machine.

BACKGROUND

A frame of a construction machine, for example a dozer, supports various components of the construction machine. The frame has different portions to support different structures and components thereon.

Typically, the frame of a dozer includes a main frame and a front frame. Some dozer frames utilize horizontal lift cylinders connected directly to a main frame instead of the using vertical lift cylinders mounted to a radiator guard. This design allows a C-frame coupled to the dozer blade and lift cylinders to operate further inboard of the frame, such that the tracks can be closer to the longitudinal axis of the machine. These changes enable machine weight reductions and improved machine balance. However, movement of such components closer to the longitudinal axis of the machine results in a space constraint for accommodating various components on the front portion of the frame.

Generally, the front frame includes a mounting location for an engine, radiator guards, engine enclosures, front bottom guard, etc. The front portion also incorporates a saddle for mounting an equalizer bar. The front frame is supported by the saddle portion on the frame for transferring load from the front frame to the main frame. Typically, the front frame is cantilevered from a front wall of the saddle.

To improve rigidity of the front wall for such load bearing the saddle often includes a support plate that supports the front wall of the saddle for bearing loads transferred by the front frame. The support plate in the saddle often results in increase in number of parts and structural complexity of the saddle.

Further, the equalizer bars may be designed according to performance related parameters associated with the machine, for example stiffness and oscillation angle requirements for the machine. The support plates in the equalizer bar saddle limit the dimensions of the equalizer bar that can be mounted in such saddles. Moreover, the support plates also limit the effective ground clearance for the machine U.S. Pat. No. 4,151,920 discloses a vehicle frame 10 with the front frame 66 having engine support bar 78. The shoulder 72 of the front frame 66 abuts the saddle 56 for supporting the front plates 66. In such vehicle frames, load from the front frame is first transferred to the saddle, and then ultimately to the main frame. Thus, requiring the saddle to be structurally strong for bearing loads transferred from the front frame. Thus, adding overall structural complexity of the saddle and the frame. The present disclosure is directed to overcome one or more of the problems discussed above or other problems in the prior art.

SUMMARY OF THE INVENTION

A frame assembly for a machine is disclosed. The frame assembly includes a main frame including a pair of spaced apart members extending longitudinally between the front and back of the machine and a front frame. The front frame includes a top plate having a first portion extending between the spaced apart members and a bottom plate coupled to the top plate. The bottom plate has a second portion extending between the spaced apart members. The front frame is connected to the main frame by attaching at least a portion of the first portion and at least a portion of the second portion to the spaced apart members.

A machine including a frame assembly is disclosed. The frame assembly includes a main frame including a pair of spaced apart members extending longitudinally between the front and back of the machine and a front frame. The front frame includes a top plate having a first portion extending between the spaced apart members and a bottom plate coupled to the top plate. The bottom plate has a second portion extending between the spaced apart members. The front frame is connected to the main frame by attaching at least a portion of the first portion and at least a portion of the second portion to the spaced apart members. The machine further includes a power source supported by the front frame.

DETAILED DESCRIPTION

Figure 1:
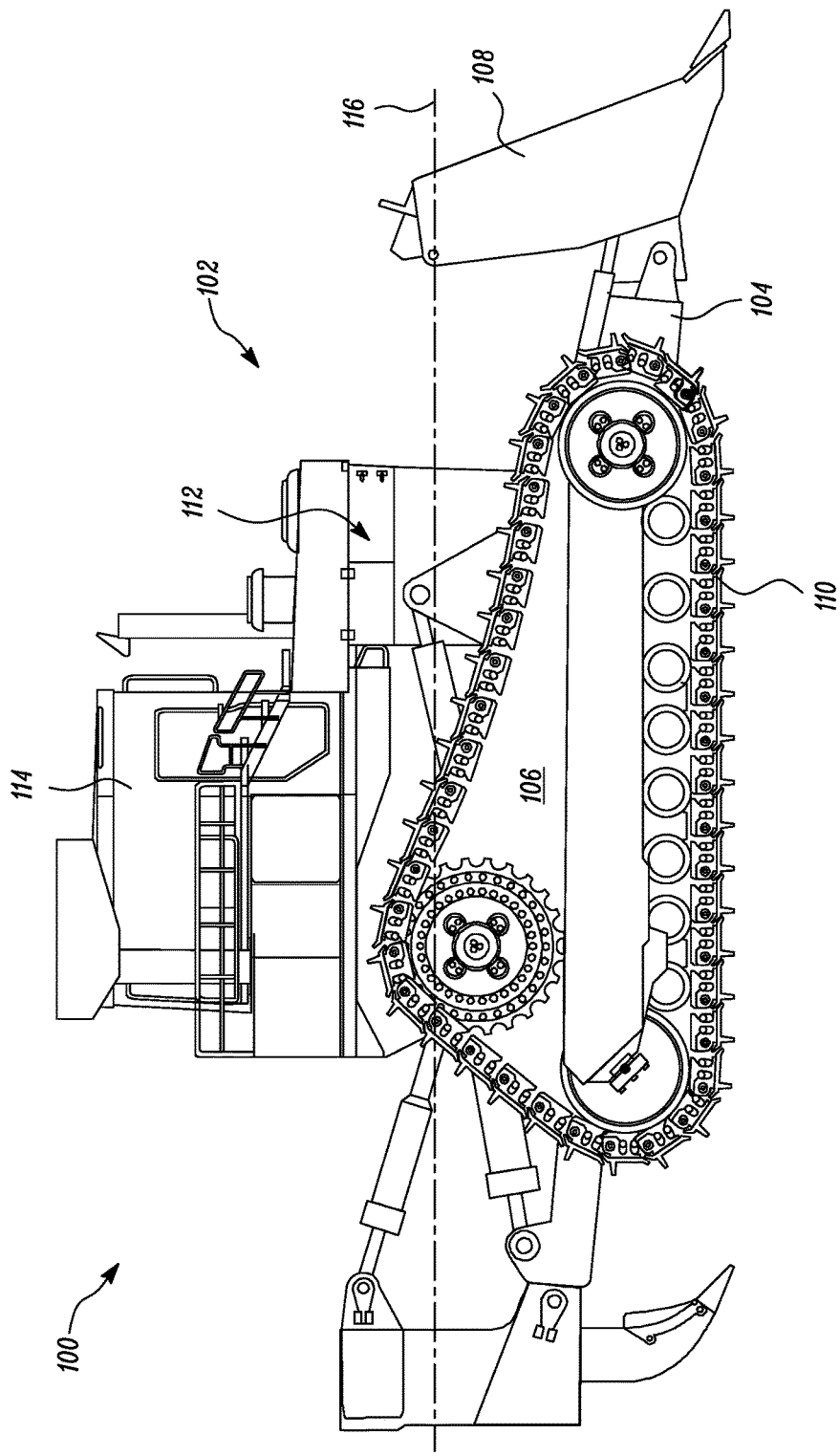
FIG. 1 illustrates a schematic diagram of a construction machine.

FIG. 1 illustrates a machine 100, for example a track type dozer. The machine 100 may be used to perform various construction related tasks, for example moving a large amount of soil. It may be understood that the machine 100 may be any other machine, for example a wheeled dozer, a skidder, tracked loader, compactor etc. The machine 100 may include a track type tractor 102 having a push arm 104, a frame 106, an implement 108 mounted on the push arm 104, a pair of tracks 110, a power source 112 and an operator cabin 114. FIG. 1 illustrates the implement 108 as a blade. However, the implement 108 may be any other implement based on construction related task to be performed, for example a bucket. Further, the machine 100 may have a longitudinal axis 116.

Figure 2:
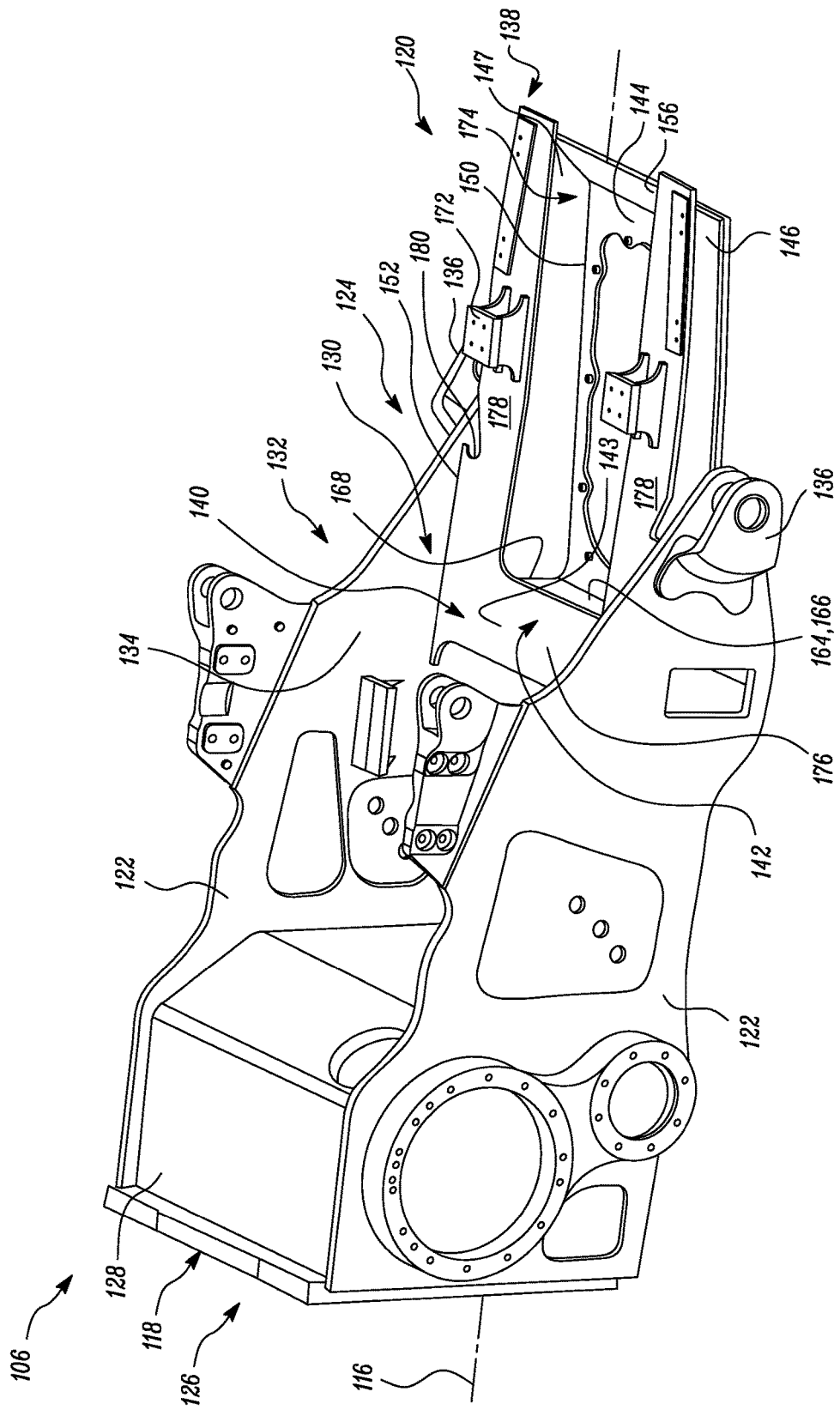
FIG. 2 illustrates a perspective view of a frame for a construction machine.

FIG. 2 illustrates a top perspective view of the frame 106 in accordance with an embodiment. The frame 106 may support various components of the machine 100, for example the operator cabin 114, the power source 112, the push arm 104, etc. The frame 106 may be made of any suitable material such as steel.

As illustrated in FIG. 2, the frame 106 includes a main frame 118 and a front frame 120. The main frame 118 may include two spaced apart members 122 extending about the longitudinal axis 116 of the machine 100 between a front portion 124 and a back portion 126. In the exemplary embodiment illustrated in FIG. 2, the members 122 are shown as upright metal plates laterally spaced apart from each other about the longitudinal axis 116. The members 122 may be connected to each other via a back plate 128 at the back portion 126. Further, the members 122 may define an inboard side 130 laterally between the two members 122 and an outboard side 132 laterally outside the two members 122. The members 122 may define an inboard surface 134 facing the inboard side 130 of the main frame 118. The main frame 118 may include support structures 136 at the front portion 124 to support the push arm 104 using support structures 136 as suitable.

The front frame 120 may be positioned on the inboard side 130 of the main frame 118 and is connected to the front portion 124 of the main frame 118. As illustrated in FIG. 2, the front frame 120 may be positioned on the main frame 118 such that the front end 138 is disposed away from the front portion 124 of the main frame 118 and the back end 140 disposed between the spaced apart members 122 such that the front frame 120 partly extends beyond the spaced apart members 122. In an embodiment, the front frame 120 may be positioned entirely on inboard side 130 between the members 122.

Figure 3:
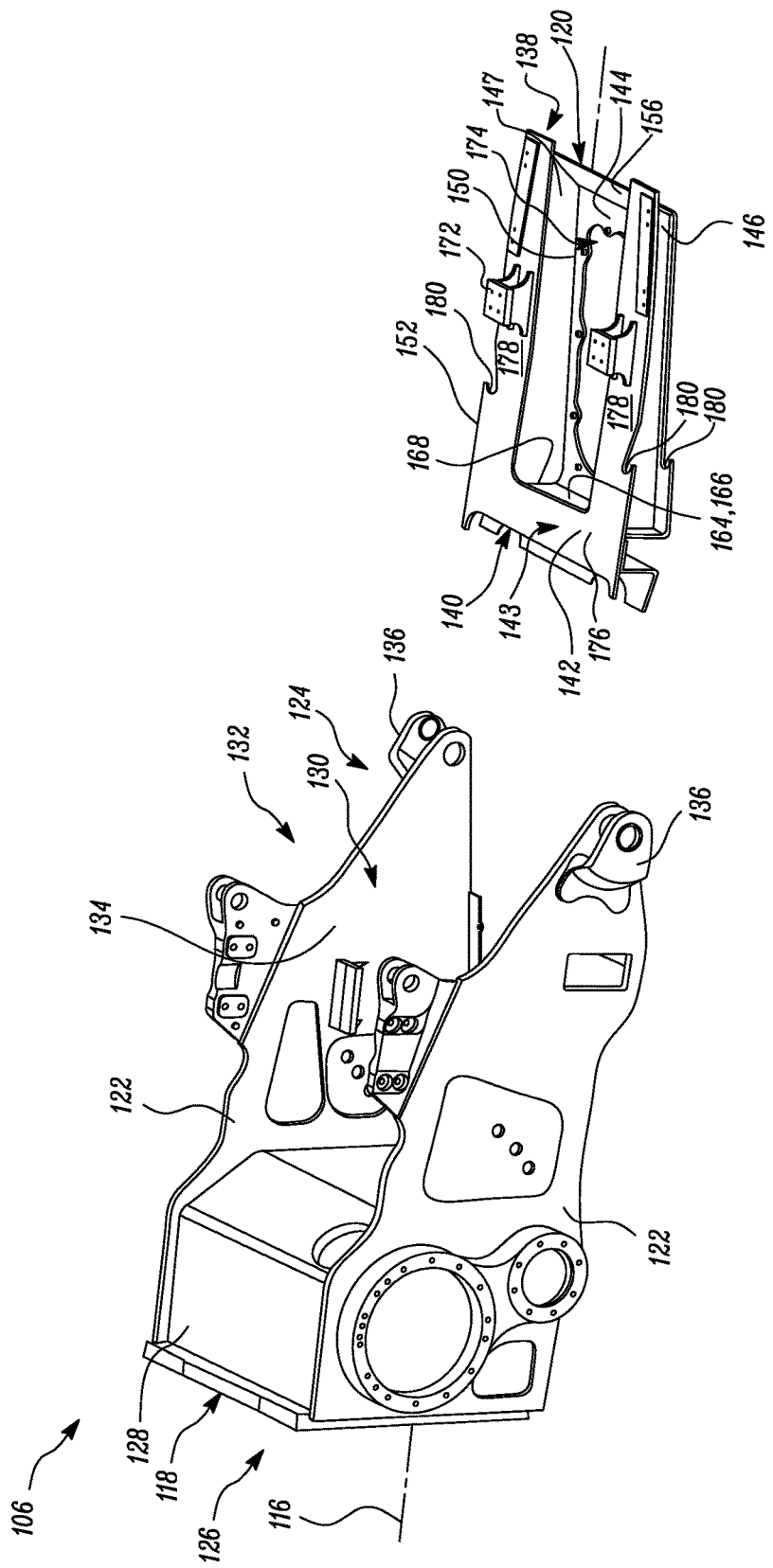
FIG. 3 illustrates an exploded view of a frame shown in FIG. 2.
Figure 4:
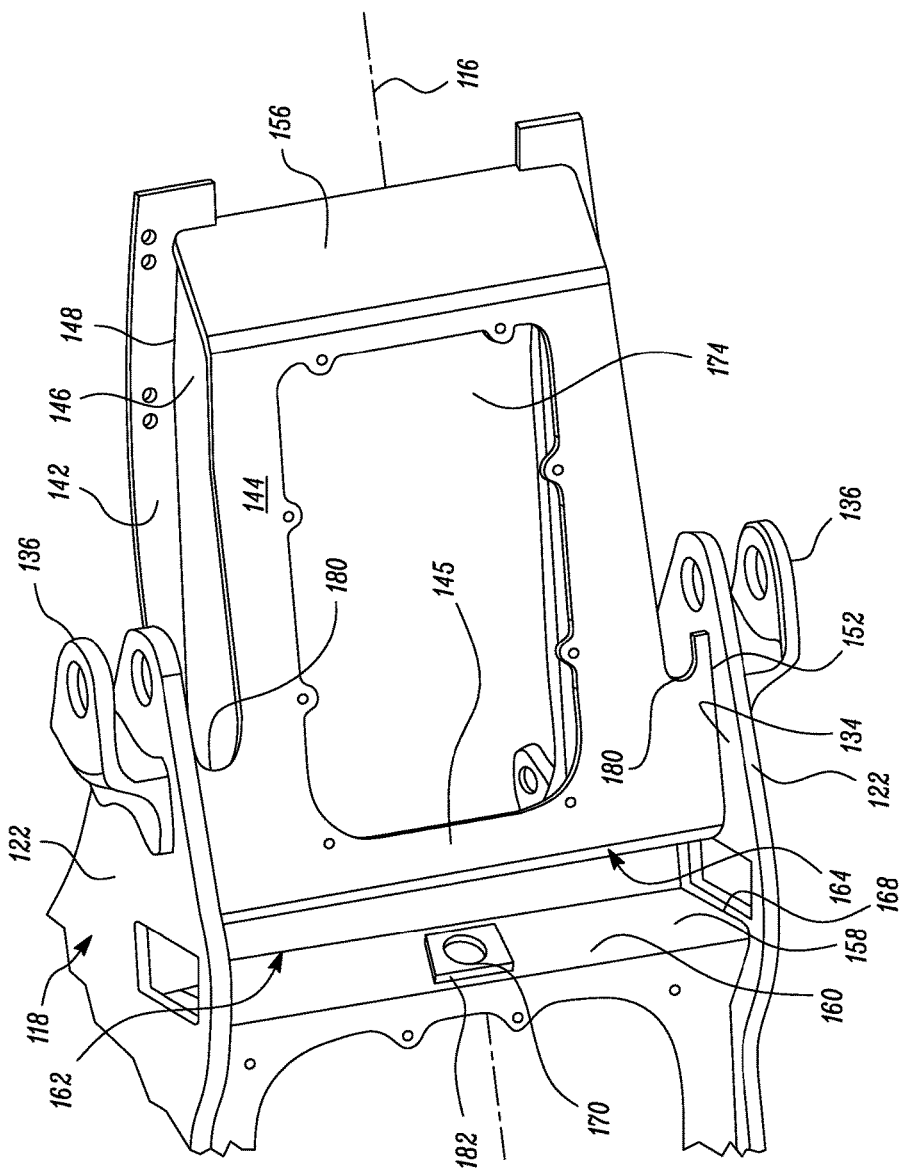
FIG. 4 illustrates a bottom perspective view of a frame for a construction machine.

The front frame 120 may have front end 138, a back end 140, a top plate 142, a bottom plate 144, a first spacer plate 146 and a second spacer plate 147. The top plate 142 and the bottom plate 144 may be substantially planar in shape and oriented substantially horizontally along the longitudinal axis 116 of the machine 100. Referring to FIG. 2-4, the top plate 142 may have a first portion 143 extending between the members 122 and the bottom plate 144 may have a second portion 145 extending between the members 122. The top plate 142 may extend beyond the bottom plate 144 between the members 122. The bottom plate 144 may have a front bent end 156 bent upwards towards the top plate 142 and attached to the top plate 142 at the front end 138.

The top plate 142 may be used as a mounting location for various components that are disposed towards the front portion 124 of the frame 106. The top plate 142 may include a mounting structure 172 for the power source 112, for example an engine. As illustrated in FIG. 2, the top plate 142 may have a traverse section 176 and two legs 178 extending towards the front end 138 from the traverse section 176. Further, the top late 142 and the bottom plate 144 may define an opening 174 at a middle portion to accommodate any structure or shape of any mounted component, for example power source 112. The mounting structure 172 may be positioned on the top plate 142 at legs 178 of the top plate 142.

The front frame 120 may be connected to the main frame 118 by attaching at least a portion of the first portion 143 and at least a portion of the second portion 145 to the spaced apart members 122. The portion of the top plate 142 that extends beyond the bottom plate 144 between the members 122 may be connected to the spaced apart members 122. In the embodiment as illustrated in FIG. 2-4, the top plate 142 and the bottom plate 144 each has longitudinal edges 152 extending substantially parallel to the longitudinal axis 116 of the machine 100 and disposed laterally opposite to each other at the back end 140. The longitudinal edges 152 of each of the top plate 142 and the bottom plate 144 may have a length that is attached, for example by welding, to the inboard surface 134 at the front portion 124 of the machine 100. The longitudinal edges 152 of the top plate 142 may be vertically spaced apart from the longitudinal edges 152 of the bottom plate 144. The attachment of the longitudinal edges 152 of both, the top plate 142 and the bottom plate 144, to inboard surface 134 of the members 122 of the main frame 118 may provide for sufficient strength and rigidity to the front frame 120 for load bearing. The loads bore by the front frame 120 may be transferred to the main frame 118 in this manner.

The length of the longitudinal edges 152 that are attached to the inboard surface 134 may be determined based on desired load bearing parameters associated with the front frame 120. The load bearing parameters may be associated with the total load bore by the front frame 120, including the transient load during operation of the machine 100.

Further, the top plate 142 may have a first extension member 158 bent downwards from the top plate 142 and forming a back wall 160 of a saddle 162 for mounting an equalizer bar. Similarly, the bottom plate 144 may have a second extension member 164 bent upwards towards the top plate 142 that forms a front wall 166 of the saddle 162. The front wall 166 and the back wall 160 may be oriented substantially vertical or upright. In an embodiment, the first extension member 158 and the second extension member 164 may be substantially parallel to each other. It may be understood that the front wall 166 or the back wall 160 each may either be integral with the bottom plate 144 or the top plate 142, respectively, or be a separate section attached to the bottom plate 144 or the top plate 142. The laterally opposite side edges 168 of the first extension member 158 and the second extension member 164 may be attached to the inboard surface 134 of the members 122 for providing sufficient structural rigidity to the saddle 162 for bearing load transferred by the equalizer bar mounted in the saddle 162. The front wall 166 and the back wall 160 each may have a receptacle 170 or recess to receive a pin (not shown) for pivotally mounting the equalizer bar. Further, the front wall 166 and the back wall 160 of the saddle 162 may each have a localized thickness 182 at a laterally middle section for supporting the pin that pivotally couples the equalizer bar.

The longitudinal edges 152 that are attached to the inboard surface 134 may have arcuate sections 180 extending from the longitudinal edges 152 to increase overall length of attachment of the top plate 142 to the inboard surface 134 and provide for sufficient room for mounting or servicing any implement 108 on a support structure 136 disposed on the front portion 124, for example mounting the push arm 104 on the support structures 136. The increased length of the longitudinal edges 152 attached to the inboard surface 134 may help in achieving required rigidity for the connection of the front frame 120 to the main frame 118. Similarly, as illustrated in FIG. 4, the bottom plate 144 may be provided with arcuate sections 180 extending from the longitudinal edges 152 for providing room for mounting or servicing the implement 108 on the support structures 136 on the front portion 124 of the members 122.

Further, the pair of spacer plates 146, 147 may extend longitudinally and be placed upright between the top plate 142 and the bottom plate 144. The spacer plates 146, 147 may have a top edge 148 abutting the top plate 142 and a bottom edge 150 abutting the bottom plate 144. The top edge 148 and the bottom edge 150 may be attached to the top plate 142 and bottom plate 144, respectively, using any known method in the art, for example, rivets, fasteners, welding etc. The spacer plates 146, 147 sandwiched between the top plate 142 and the bottom plate 144 may support the top plate 142 against the bottom plate 144 and add to the overall structural strength and rigidity of the front frame 120 for load bearing. In an embodiment, the first spacer plate 146 may be connected to one of the members 122 and the second spacer plate 147 may be connected to the other member 122.

INDUSTRIAL APPLICABILITY

Frame of machines, such as dozer, generally has a front frame cantilevered from an equalizer bar saddle for transferring the loads from the front frame to a main frame. Generally, the front frame is supported against the front wall of the saddle. Thus, the saddle in such machines are required to be structurally strong for bearing the loads transferred from the front frame. The saddle often includes a support plate that supports the front wall of the saddle for load bearing. The existence the support plate in the saddle often results in increase in number of parts and structural complexity of the saddle. Moreover, if the support plate is located below the equalizer bar mounted in the saddle, i.e. at a bottom portion of the saddle, the support plate further limits the structural dimensions of the equalizer that can be mounted on such saddle.

The frame 106 according to present disclosure provides for the front frame 120 including a top plate 142 and a bottom plate 144. The longitudinal edges 152 of the top plate 142 and the bottom plate 144 are directly attached to the main frame 118 by attaching a sufficient length of the longitudinal edges 152, such that the front frame 120 may directly transfer the loads effectively to the main frame 118. Thus, the frame 106 in accordance with the present disclosure provides for greater degree of freedom for designing the saddle 162 for mounting the equalizer bar.

Moreover, the elimination of need of a support plate further simplifies the saddle structure by reducing the overall number of parts in the saddle 162 and the frame 106. Also, the elimination of support plate from the saddle 162 provides for improved ground clearance and also room for mounting equalizer bars with greater dimensions. Thus, present disclosure provides for the frame 106 with improved ground clearance for the machine 100.

Further, the present disclosure provides for a simplified saddle 162 structure for a frame 106 of a machine 100. The saddle 162 may be formed by a first extension member 158 bent downwards from the top plate and a second extension member 164 bent upwards from the bottom plate 144. The saddle 162 may be an open bottom saddle capable of mounting an equalizer bar.

What is claimed is:

1. A frame assembly for a machine, comprising:
    a main frame including a pair of spaced apart members extending longitudinally between the front and back of the machine; and
    a front frame comprising a top plate having a first portion extending between the spaced apart members, a bottom plate coupled to the top plate, the bottom plate having a second portion extending between the spaced apart members, the front frame being connected to the main frame by attaching at least a portion of the first portion and at least a portion of the second portion to the spaced apart members;
    a first extension member extending downwards from the top plate and between the spaced apart members; the first extension member defining a first wall of a saddle for mounting an equalizer bar; and
    a second extension member extending upwards from the bottom plate and between the spaced apart members; the second extension member defining a second wall of the saddle.

2. The frame assembly of claim 1, wherein the first extension member and the second extension member are substantially parallel to each other.

3. The frame assembly of claim 1, wherein each of the first extension member and the second extension member are connected to the spaced apart members.

4. A machine comprising:
    a frame assembly comprising:
        a main frame including a pair of spaced apart members extending longitudinally between the front and back of the machine; and
        a front frame comprising a top plate having a first portion extending between the spaced apart members, a bottom plate coupled to the top plate, the bottom plate having a second portion extending between the spaced apart members, the front frame being connected to the main frame by attaching at least a portion of the first portion and at least a portion of the second portion to the spaced apart members; and
    a power source supported by the front frame,
    wherein the top plate is configured to extend beyond the bottom plate between the spaced apart members.

5. The machine of claim 4, wherein the portion of the top plate extending beyond the bottom plate is connected to the spaced apart members.

6. A machine comprising:
    a frame assembly comprising:
        a main frame including a pair of spaced apart members extending longitudinally between the front and back of the machine; and
        a front frame comprising a top plate having a first portion extending between the spaced apart members, a bottom plate coupled to the top plate, the bottom plate having a second portion extending between the spaced apart members, the front frame being connected to the main frame by attaching at least a portion of the first portion and at least a portion of the second portion to the spaced apart members; and
    a power source supported by the front frame;
    a first extension member extending downwards from the top plate and between the spaced apart members; the first extension member defining a first wall of a saddle for mounting a equalizer bar; and
    a second extension member extending upwards from the bottom plate and between the spaced apart members; the second extension member defining a second wall of the saddle.

7. The machine of claim 6, wherein the first extension member and the second extension member are substantially parallel to each other.

8. The machine of claim 6, wherein each of the first extension member and the second extension member are connected to the spaced apart members.

* * * * *